US006902145B2

(12) United States Patent
Latzer et al.

(10) Patent No.: US 6,902,145 B2
(45) Date of Patent: Jun. 7, 2005

(54) REGULATING SLIDE VALVE

(75) Inventors: Klaus Latzer, Rankweil (AT); Florian Ehrne, Feldkirch (AT)

(73) Assignee: VAT Holding AG, Haag (CH)

( * ) Notice: Subject to any disclaimer, the term of this patent is extended or adjusted under 35 U.S.C. 154(b) by 32 days.

(21) Appl. No.: 10/465,447

(22) Filed: Jun. 19, 2003

(65) Prior Publication Data

US 2004/0256591 A1 Dec. 23, 2004

(51) Int. Cl.[7] ............................................... F16K 25/00
(52) U.S. Cl. ..................... 251/170; 251/177; 251/193; 251/301
(58) Field of Search ................. 251/170, 177, 251/178, 193, 301, 302, 326, 176, 195, 196

(56) References Cited

U.S. PATENT DOCUMENTS

| | | | | |
|---|---|---|---|---|
| 1,287,975 A | * | 12/1918 | Haatvedt | 251/177 |
| 1,723,264 A | * | 8/1929 | Gemmel | 251/177 |
| 1,991,006 A | * | 2/1935 | Wilson | 251/177 |
| 3,047,006 A | * | 7/1962 | Transeau | 251/177 |
| 3,145,969 A | | 8/1964 | Von Zweck | |
| 3,343,562 A | * | 9/1967 | Combes | 251/175 |
| 3,870,071 A | * | 3/1975 | Graham et al. | 251/177 |
| 4,285,498 A | * | 8/1981 | Nightingale | 251/214 |
| 5,577,707 A | | 11/1996 | Brida | |
| 5,868,378 A | * | 2/1999 | McMahon et al. | 251/315.08 |
| 5,873,562 A | | 2/1999 | Marugg | |

* cited by examiner

*Primary Examiner*—John Bastianelli
(74) *Attorney, Agent, or Firm*—Reed Smith LLP

(57) ABSTRACT

Regulating slide valve comprising a valve body having a valve opening, and a valve plate which has two side surfaces and which is displaceable along a displacement path between an initial position in which it releases the valve opening and an end position in which it completely covers the valve opening, this displacement path forming the regulating area of the valve; wherein the valve plate has a contact ring on one side surface, which contact ring projects over the side surface of the valve plate and is mounted at or in the valve plate by a spring device, can be pressed in against the spring force of the spring device in the direction of the valve plate and contacts a contact surface of the valve body at least over a portion of its circumference in the end position of the valve plate.

24 Claims, 9 Drawing Sheets

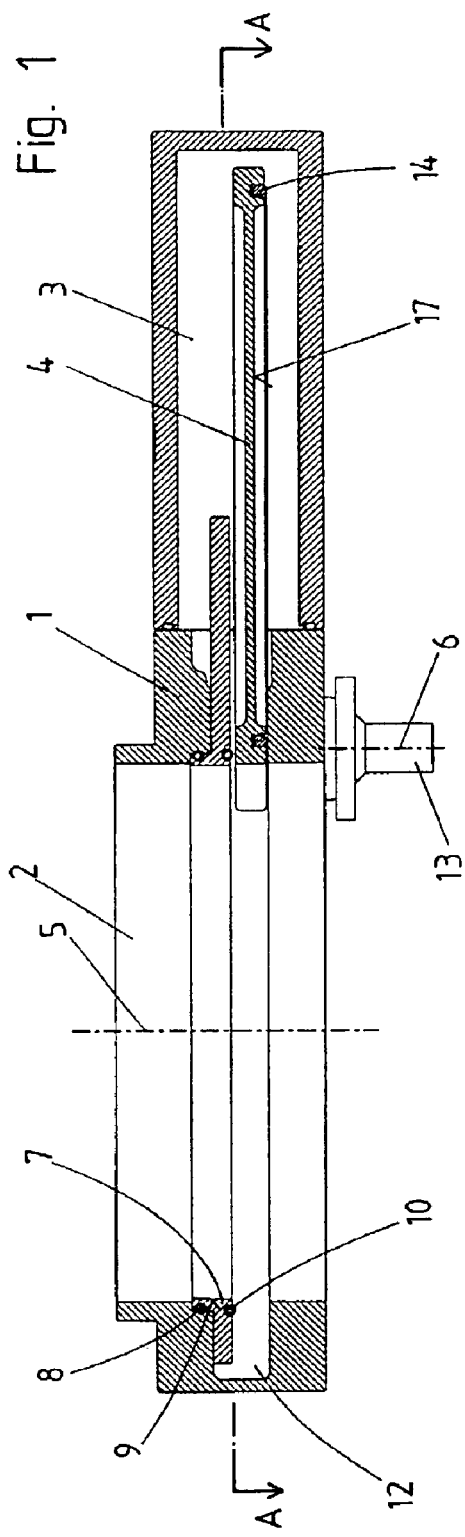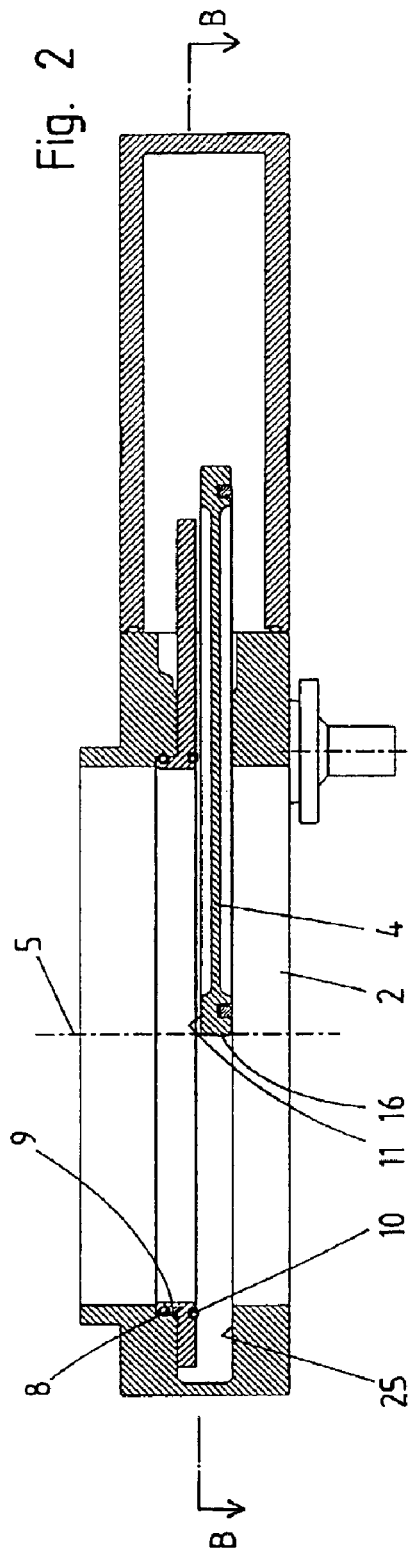

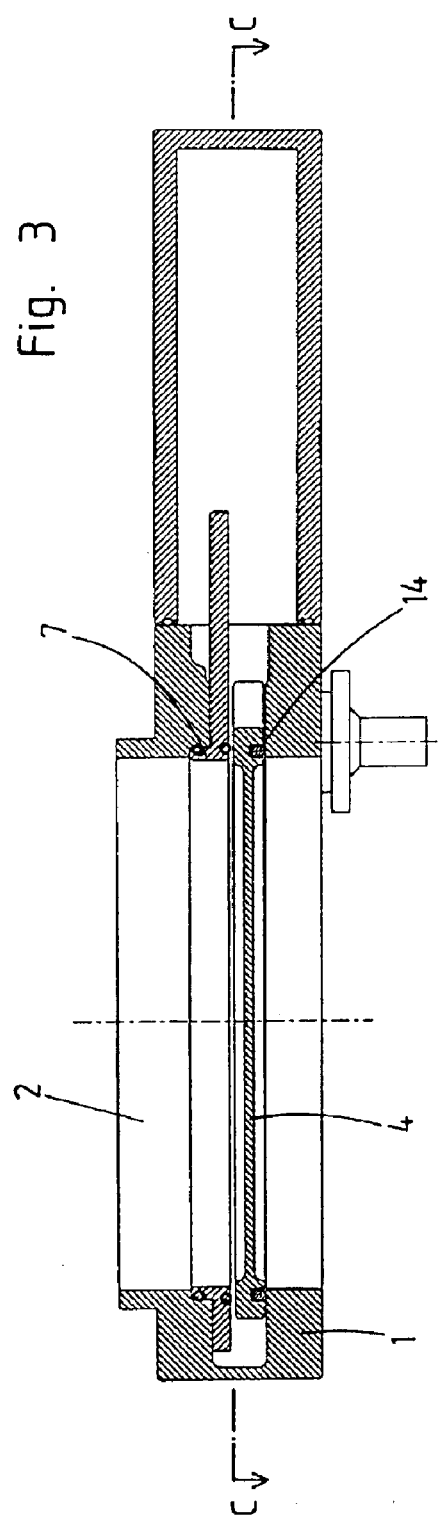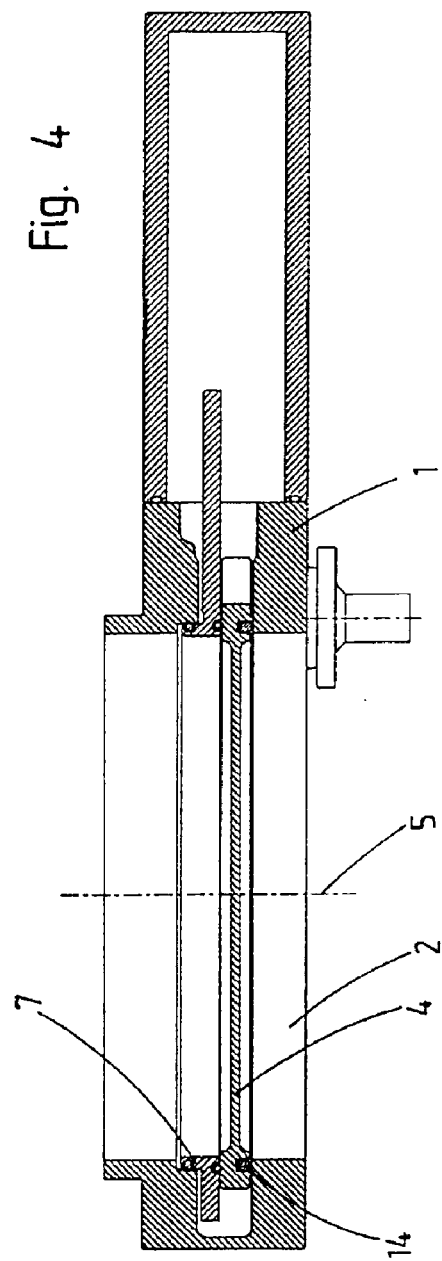

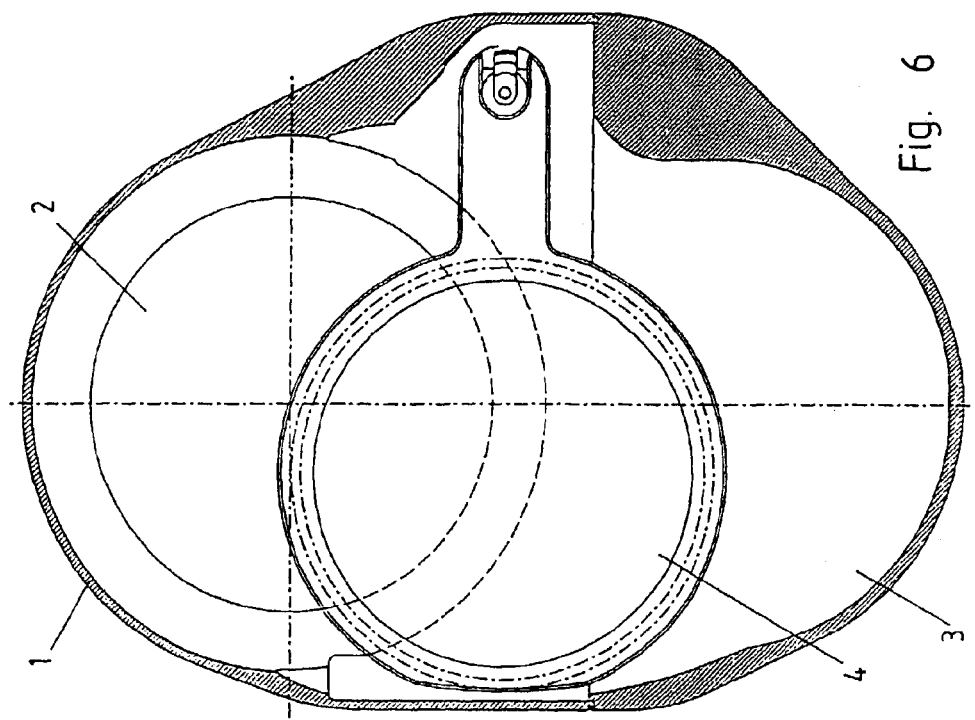
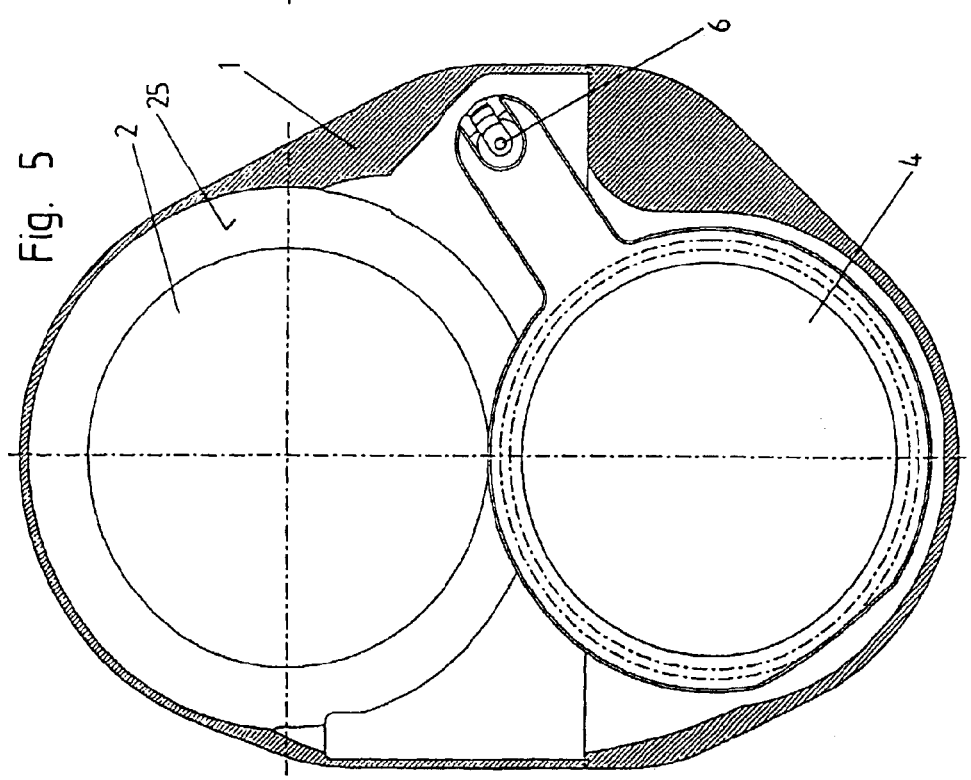

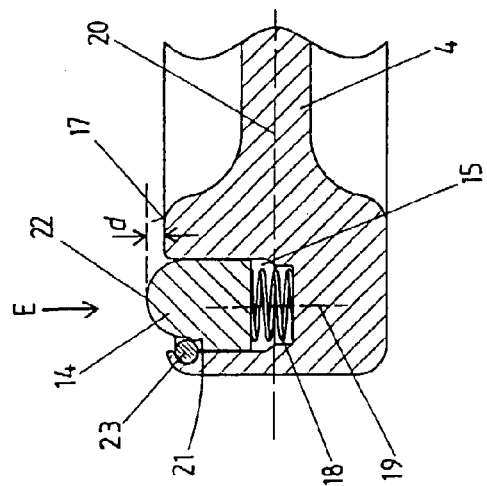
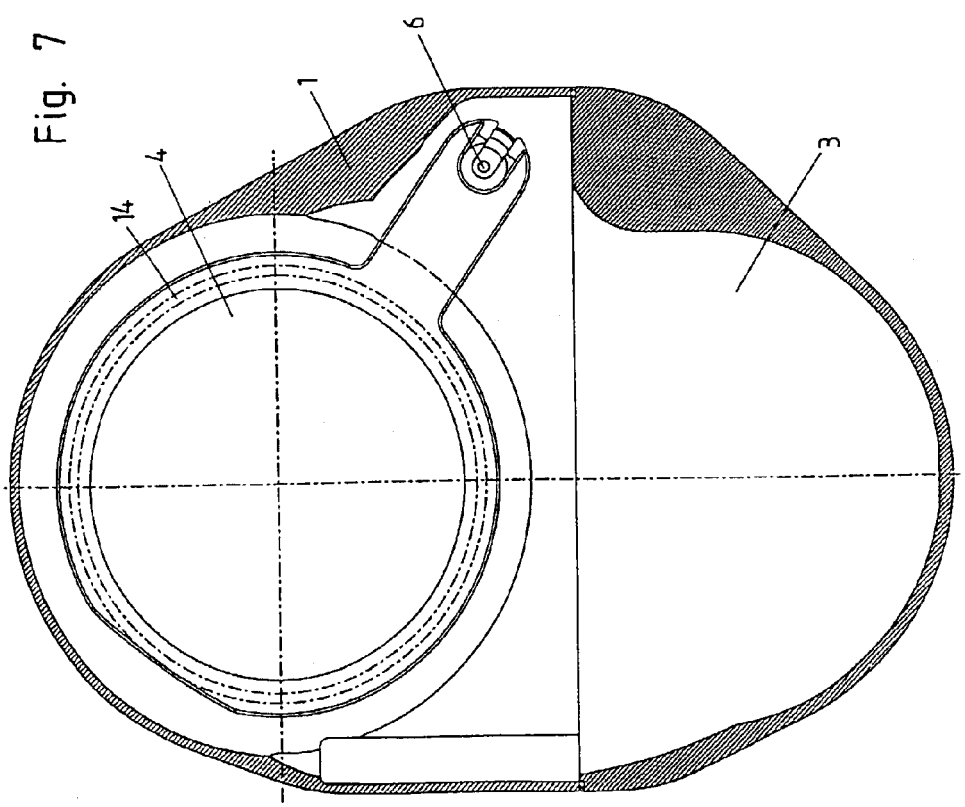

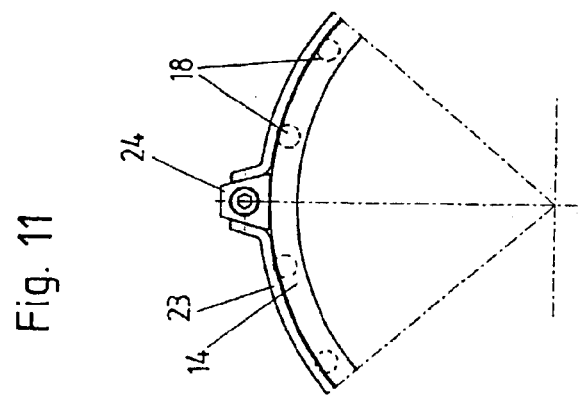
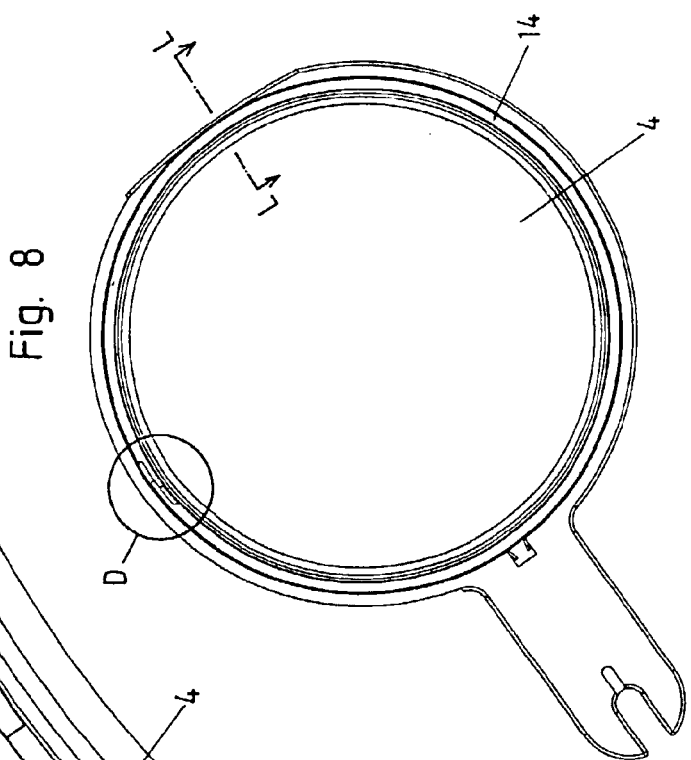
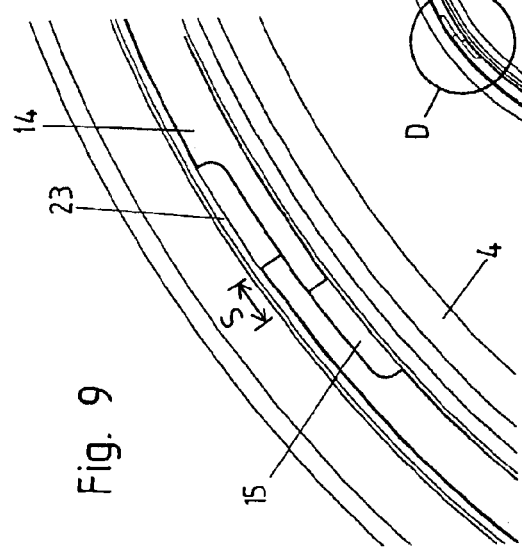

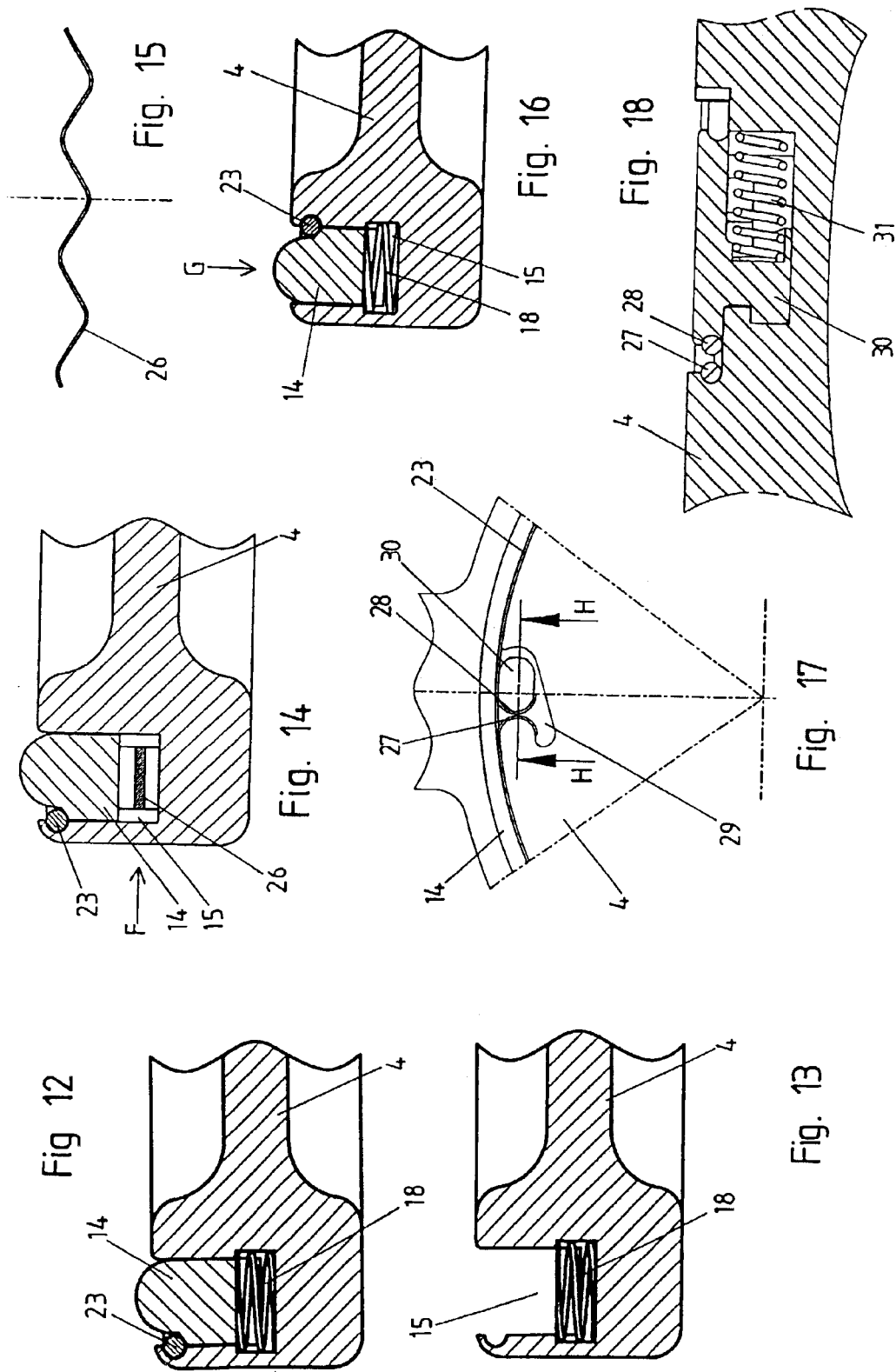

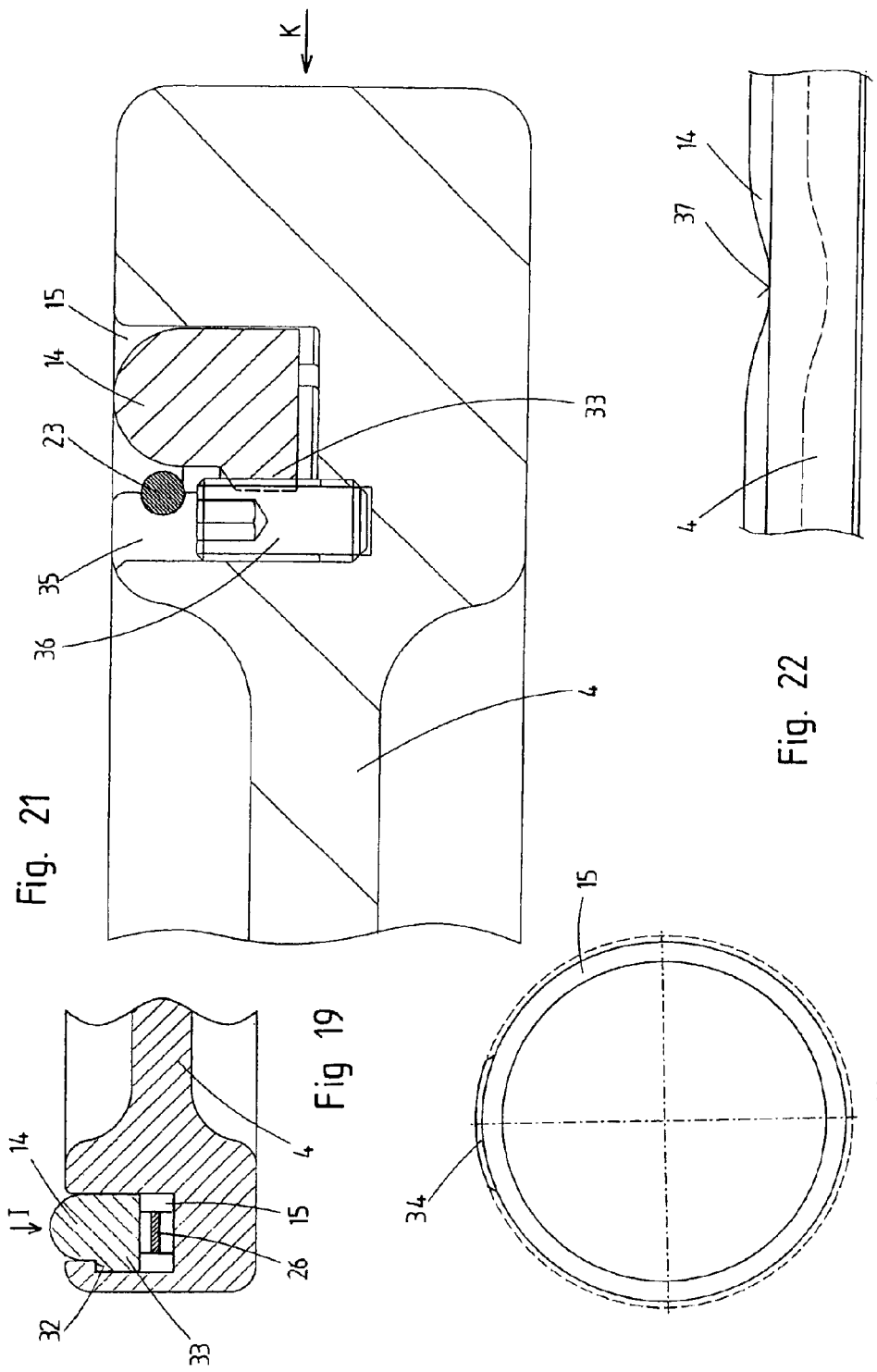

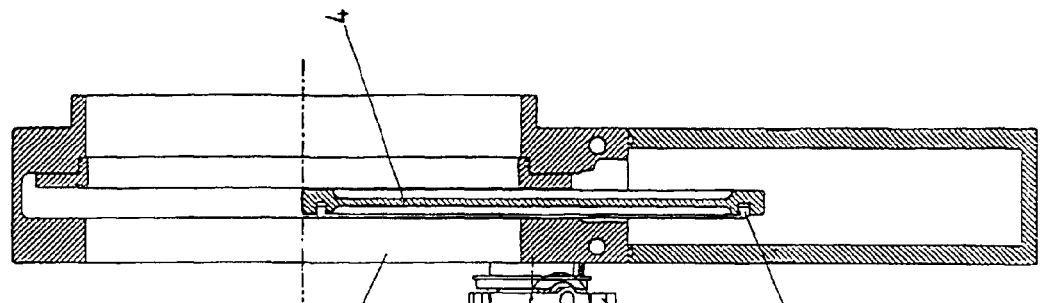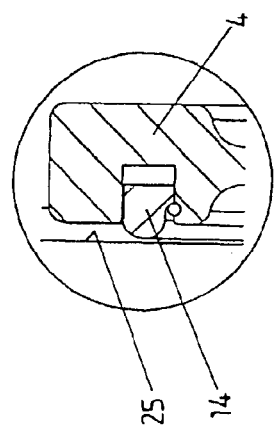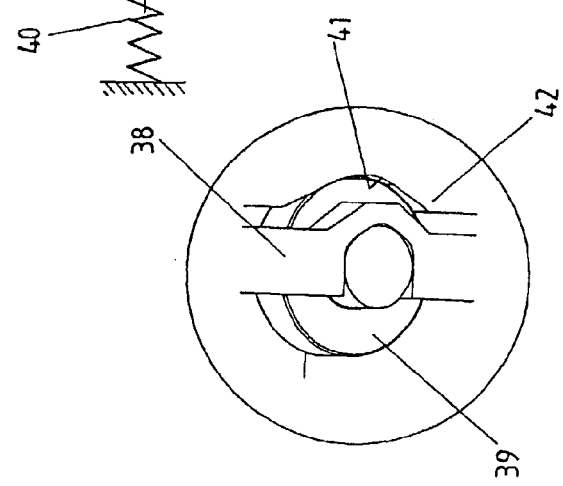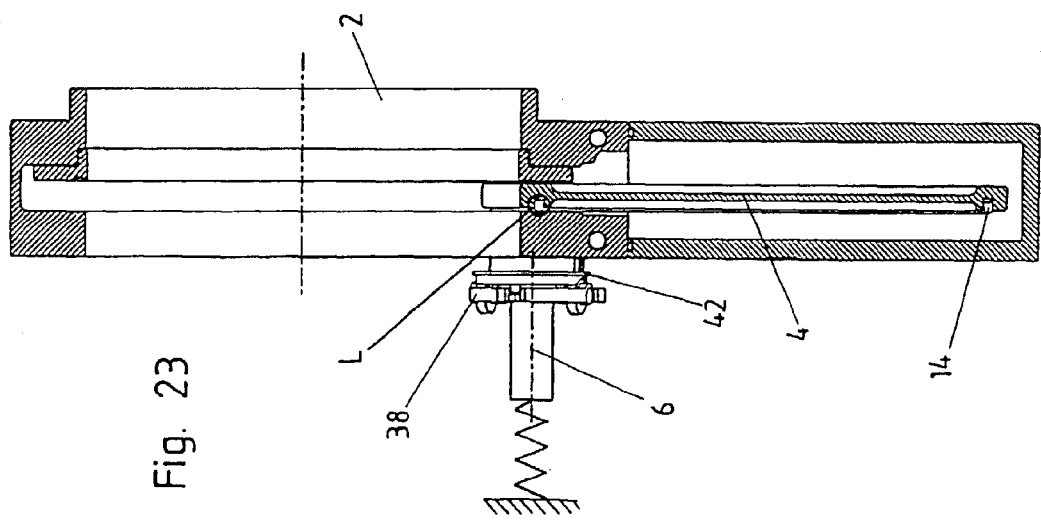

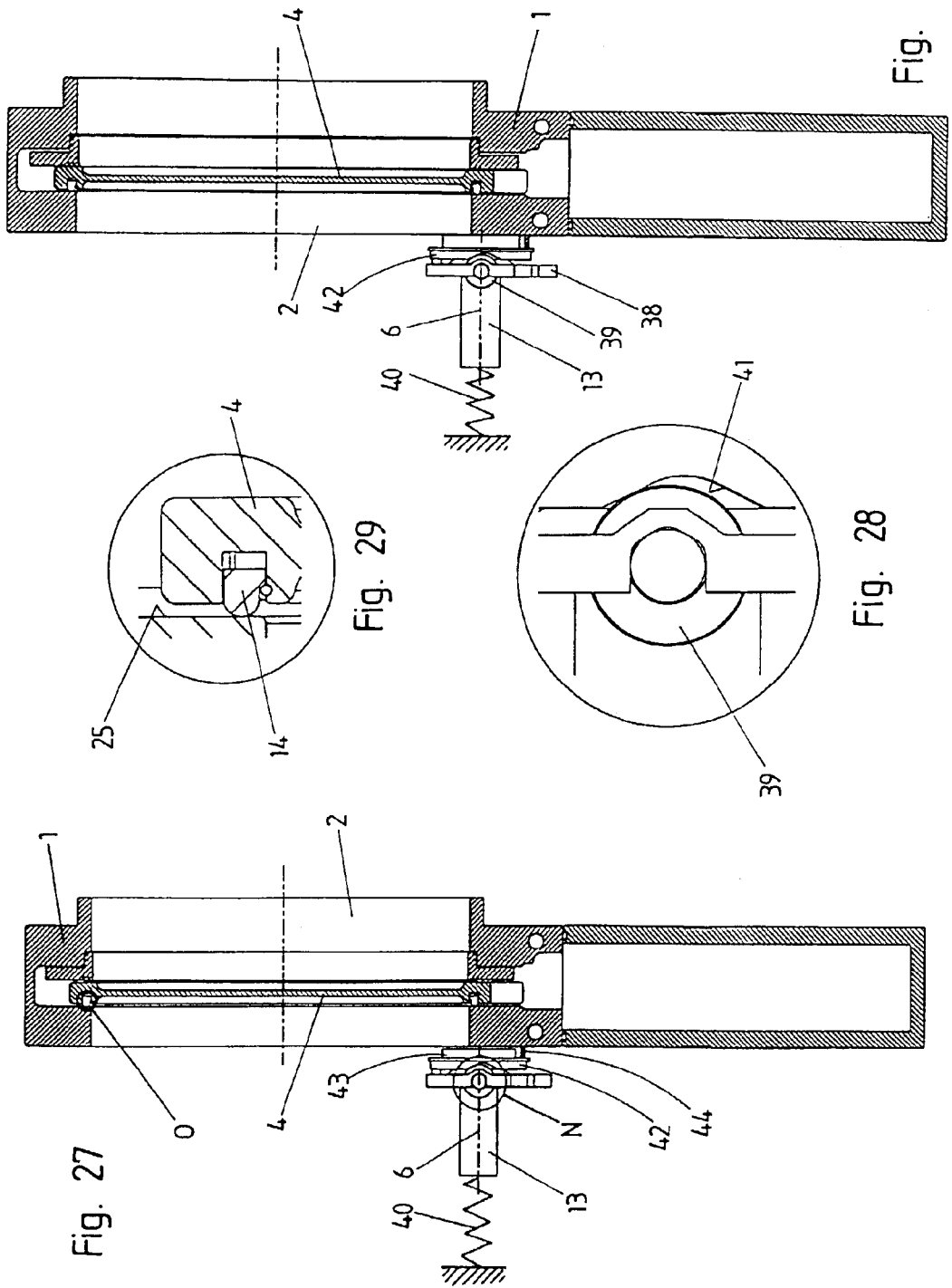

REGULATING SLIDE VALVE

BACKGROUND OF THE INVENTION a) Field of the Invention

The invention is directed to a slide valve with a controllable flow section of the valve opening. The invention is especially directed to a regulating slide valve comprising a valve body having a valve opening, and a valve plate which has two side surfaces and which is displaceable along a displacement path between an initial position in which it releases the valve opening and an end position in which it completely covers the valve opening, this displacement path forming the regulating range of the valve.

b) Description of the Related Art

Slide valves in which the valve plate is located to the side of the valve opening in the opened state and is displaceable into a position in which the valve opening is covered in order to close the valve are known in various constructional forms. In slide valves which are constructed as regulating valves, the valve plate is displaceable into different intermediate positions between its starting position and its end position by means of the correspondingly constructed drive for this valve plate. Stepper motors, for example, can be used to drive the valve plate. Other known regulating slide valves serve only for regulating and they still have a certain residual conductance even when closed as far as possible. Other known regulating slide valves are completely sealable.

Usually, the valve plates of slide valves are displaceable transverse to the axis of the through-channel forming the valve opening and at least substantially in their own plane between the position in which the valve opening is released and the position in which the valve opening is covered. So-called L-movements in which a displacement is initially carried out in the plane of the valve plate and then vertical thereto after reaching its position in which the valve opening is covered, and grinding movements (with movement components diagonal to the plane of the valve plate, particularly shortly before closure of the valve), also called J-movements, are known. The displacement of the valve plate can be effected linearly or, in case of a so-called pendulum slide, the valve plate can be adjusted by a swiveling movement around an axis vertical to the valve plate.

U.S. Pat. No. 5,577,707 discloses a slide valve in which an annular seal connection piece is provided for sealing the valve plate relative to the valve body in the closed (sealed) state of the valve. The seal connection piece is mounted in the through-channel so as to be displaceable vertical to the plane of the valve plate and engages at the sealing plate in the closed and sealed state of the valve. Another slide valve of this type in which the conductance of the valve can also be regulated in addition is known from U.S. Pat. No. 5,873,562 A. This reference mentions additional references, particularly U.S. Pat. No. 3,145,969 A, which disclose seal connection pieces that can engage at the valve plate.

The minimum conductance to which the valve known from U.S. Pat. No. 5,873,562 A can be regulated is reached in the end position of the valve plate in which the valve plate completely covers the valve opening. This is the position in which the annular seal connection piece could be pressed against the valve plate (but raised from the latter) for completely sealing the valve. The remaining conductance in this position of the valve plate which completely covers the valve opening depends on the residual gap remaining between the valve plate and the valve body. The smallest gap width between the valve plate and the valve body by which this residual gap is defined is on the side of the valve plate remote of the seal connection piece, namely, between the valve plate and a surface which lies in the plane of the valve plate and which is located opposite the valve plate in an area adjoining its lateral edge. Due to manufacturing tolerances and differential pressure which can act to various degrees on the valve plate and can displace the latter somewhat in axial direction of the through-channel of the valve, this residual gap can not be as small as desired. When closing the valve, the valve plate should not move toward the valve body so that unwanted particles are released into the vacuum. Therefore, an appropriate quantity for the residual gap is around 1 mm, for example. The minimum conductance to which the valve can be regulated is, for example, for nitrogen) 15 l/sec.

OBJECT AND SUMMARY OF THE INVENTION

An important object of the invention is to provide a regulating slide valve of the type mentioned in the beginning which can be regulated to a very small minimum conductance.

Another object of the invention is to provide a regulating slide valve of the type mentioned in the beginning in which manufacturing tolerances have the least possible effect on the minimum conductance that can be regulated.

Another object of the invention is to provide a regulating slide valve of the type mentioned in the beginning in which there is no hysteresis behavior of the regulated conductance as far as possible at the minimum conductance that can be regulated.

A regulating slide valve according to the invention comprises a valve body having a valve opening, a valve plate which has two side faces and which is displaceable along a displacement path between an initial position in which it releases the valve opening and an end position in which it completely covers the valve opening, wherein this displacement path forms the regulating area of the valve; wherein the valve plate has a contact ring on one side, which contact ring projects over the side surface of the valve plate and which is mounted at or in the valve plate by means of a spring device, can be pressed in in the direction of the valve plate against the spring force of the spring device and contacts a contact surface of the valve body at least over a portion of its circumference in the end position of the valve plate.

A very small conductance can be regulated in the end position of the valve plate by means of the contact ring which can be made of plastic, e.g., PTFE (Teflon), in an advantageous embodiment form of the invention. The contact ring can span various gap widths between the valve plate and the contact surface provided at the valve body due to the fact that the contact ring is spring-mounted. Various gap widths such as these can occur as a result of manufacturing tolerances and/or different differential pressures. The width of the bridged gap can also change in the circumferential direction of the valve plate.

It is conceivable and possible in principle that a regulating slide valve according to the invention is provided only for regulating a gas flow, but does not have a sealed state. On the other hand, a regulating slide valve according to the invention also makes it possible to completely seal the valve opening. For this purpose, it is provided in a preferred embodiment example of the invention that the valve has an annular seal connection piece which can be moved between a position in which it is lifted from the valve opening and a position in which it engages against the valve plate and in which it seals the valve plate relative to the valve body in the end position of the valve plate in which the valve opening is completely covered.

Further advantages and details of the invention are described in the following with reference to the embodiment examples shown in the drawings, from which further objects of the invention will become apparent.

BRIEF DESCRIPTION OF THE DRAWINGS

In the drawings:

FIG. 1 shows a schematic section through a valve according to the invention in the completely open state of the valve plate;

FIG. 2 shows a section corresponding to FIG. 1 in the partially open state of the valve plate;

FIG. 3 shows a section corresponding to FIG. 1 in the state of the valve plate in which the valve opening is completely covered, but with open seal connection piece;

FIG. 4 shows a section corresponding to FIG. 1 in the sealed (closed) state of the valve;

FIG. 5 shows a schematic section along line A—A of FIG. 1;

FIG. 6 shows a schematic section along line B—B of FIG. 2;

FIG. 7 shows a schematic section along line C—C of FIG. 3;

FIG. 8 shows a view of the valve plate on the side opposite from that shown in FIGS. 5 to 7;

FIG. 9 shows an enlarged detail D from FIG. 8;

FIG. 10 shows a cross section through the edge area of a valve plate according to a first embodiment form (section line L—L of FIG. 8);

FIG. 11 shows a portion of the contact ring and the retaining ring viewed in direction E in FIG. 10;

FIG. 12 shows a cross section through the edge area of a valve plate according to another embodiment form;

FIG. 13 shows a cross section corresponding to FIG. 12 with the contact ring and retaining ring removed;

FIG. 14 shows a cross section through the edge area of a valve plate according to another embodiment form of the invention;

FIG. 15 shows a side view of a portion of the wave spring, viewed in direction F in FIG. 14;

FIG. 16 shows a cross section through the edge area of a valve plate according to another, particularly preferred embodiment form of the invention;

FIG. 17 shows a top view of a part of the valve plate according to this embodiment example, viewed in direction G in FIG. 16;

FIG. 18 shows a section along line H—H of FIG. 17;

FIG. 19 shows a cross section through the edge area of a valve plate according to another embodiment form of the invention;

FIG. 20 shows a view of the groove in the valve plate according to this embodiment example, viewed in direction I in FIG. 19;

FIG. 21 shows a cross section through the edge area of a valve plate in the area of the formation of a regulating gap;

FIG. 22 shows a side view of the valve plate in the area of the regulating gap, viewed in direction K in FIG. 21;

FIG. 23 shows a schematic section through another embodiment example of a valve according to the invention in the completely open state of the valve plate;

FIG. 24 shows a detail L from FIG. 23;

FIG. 25 shows a section corresponding to FIG. 23 in the partially open state of the valve;

FIG. 26 shows a detail M from FIG. 25;

FIG. 27 shows a section corresponding to FIG. 23 in the end state of the valve plate in which the valve opening is completely covered, but with open seal connection piece;

FIG. 28 shows a detail N from FIG. 27;

FIG. 29 shows a detail O from FIG. 27; and

FIG. 30 shows a section corresponding to FIG. 23 in the sealed state of the valve.

The drawings have different scales. Similar parts in the different embodiment forms are designated by the same reference numbers.

DESCRIPTION OF THE PREFERRED EMBODIMENTS

FIGS. 1 to 7 show a first embodiment example of a regulating slide valve according to the invention which has a completely sealed state as well as a regulating range. This regulating slide valve comprises a valve housing or a valve body 1 which has a through-flow channel forming a valve opening 2. For the sake of simplicity, the connection flanges of the valve body serving for the connection of the valve body to a valve chamber or a pump are not shown in the drawing. A hollow space 3 which opens toward the through-flow channel is provided in the valve body 1. In the completely open state of the valve, the valve plate 4 of the valve is located in this hollow space 3 and, therefore, to the side of the through-flow channel, so that it completely releases the valve opening 2. In order to close the valve, the valve plate 4 is displaceable in its plane vertical to the longitudinal axis 5 of the through-channel until it occupies a position in which the valve opening 2 is covered (FIG. 3). FIG. 2 shows an intermediate position in which the valve plate 4 partially covers the valve opening 2. For this purpose, the valve plate 4 executes a swiveling movement around the swiveling axis 6. A slide valve of this kind is also known as a shuttle valve or pendulum valve or a pendulum slide.

However, the sealed state of the valve has not yet been reached by displacing the valve plate 4 in the position according to FIG. 3 in which the valve opening 2 is completely covered. A seal connection piece 7 which is mounted in the through-channel so as to be displaceable in axial direction is provided for sealing the valve. This seal connection piece 7 has at an outer, preferably cylindrical wall, a sealing ring 8 which contacts a corresponding wall 9 of the valve body 1 formed as a sealing surface. At a front side facing the valve plate 4, the seal connection piece 7 has another sealing ring 10 which is provided for contact at a sealing surface 11 which is provided at the side face of the valve plate 4 facing the seal connection piece, namely, in the vicinity of its edge 16 on the narrow side. In the state shown in FIG. 3, the seal connection piece 7 is raised from the sealing surface 11 of the valve plate 4 by its sealing ring 10, while in FIG. 4 it is placed tight against the sealing surface 11 by its sealing ring 10. The valve plate 4 is accordingly sealed relative to the valve body 1.

Except in the area in which the hollow space 3 opens into the through-channel, the wall of the through-channel is provided with a groove 12 into which the valve plate 4 projects by its edge 16 in the position in which the valve opening is completely covered.

By means of appropriate driving means, e.g., stepper motors, for the valve plate 4, the valve plate 4 can be displaced in a defined manner along its displacement path between the initial position (FIG. 1) in which the valve opening is completely released and the end position (FIG. 3) in which the valve opening is completely covered, so that the size of the valve opening and accordingly the conductance of the valve can be regulated along this regulating area of the valve.

The elements described above and their described functions are known and are conventional in commercially available regulating slide valves of this kind. These elements of the valve can also be constructed in another conventional manner. For example, the valve plate 4 could also be formed so as to be linearly displaceable.

The driving means for the valve plate 4 and the seal connection piece 7 are not shown in the drawings for the sake of simplicity. As was already stated, they can be constructed in conventional manner. For example, the drive for the seal connection piece 7 can be constructed in the manner described in U.S. Pat. No. 5,577,707 A or U.S. Pat. No. 3,145,969 A, wherein the contents of these publications are hereby adopted by reference. The drive for the valve plate 4 can be formed, for example, by a stepper motor acting on the axle journal 13 directly or via a transmission. The construction of the drives for the seal connection piece 7 and the valve plate 4 is not the subject of the present invention.

The side surface 17 of the valve plate 4 remote of the seal connection piece 7 is provided with a spring-mounted contact ring 14 whose construction and support are explained more exactly according to a first embodiment form from FIGS. 8 to 11. The valve plate 4 has a circumferentially closed groove 15 on its side remote of the seal connection piece 7 for receiving the contact ring 14 and its bearing. This groove 15 is introduced in the side surface 17 of the valve plate 4 remote of the seal connection piece 7 in the vicinity of the narrow-side edge 16 of the valve plate 4. A plurality of helical springs 18 (shown in dashes in FIG. 11) which are spaced apart in circumferential direction of the groove 15 and whose axes 19 extend vertical to the plane 20 of the valve plate 4 are arranged between the contact ring 14 and the base of the groove 15. For example, twenty-four such helical springs 18 can be provided at a uniform distance from one another along the circumference of the groove 15. Each of these helical springs has a relatively small spring force.

The contact ring 14 has a lateral shoulder 21 which limits the extent to which the contact ring 14 can move out of the groove 15 through the force of the helical springs 18. In the completely moved out position (FIG. 10), the outer edge 22 of the contact ring 14 projects over the side surface 17 of the valve plate 4 by a distance d. The distance d can be in the range of 1 to 5 mm, for example, about 4 mm. In this position, the shoulder 21 contacts a retaining ring 23 which is inserted into a recess in the side wall of the groove 15 located on the outer side in radial direction of the seal plate 4. The retaining ring 23 comprises a springing-elastic material and is pressed into the recess in the side wall of the groove 15 by its pretensioning. In addition, a retaining device can be provided to prevent the retaining ring from accidentally disengaging from this recess in the side wall of the groove 15. For this purpose, for example, the retaining ring 23 can be split and its end areas which are bent outward can be fixed to a securing part 24 (for example, by welding), the securing part 24 being screwed together with the valve plate 4 (FIG. 11).

The contact ring can be pressed farther into the groove 15 against the force of the helical springs 18 from its fully moved out position (FIG. 10), in which case distance d is smaller. It can also be pressed in to different degrees at different points, so that the outer edge 22 of the contact ring 14 lies in a plane extending at an angle to the plane 20 of the valve plate 4. Also, the contact ring 14 can be more or less wavy after being pressed in to various depths at various points on the circumference, the contact ring 14 being constructed so as to be sufficiently flexible for this purpose.

As can be seen from FIG. 9, the contact ring 14 is split and the two ends of the contact ring which have an area of smaller width overlap, viewed in circumferential direction, over a distance s (FIG. 9). In this way, the thermal expansion of the contact ring 14 which is made of PTFE (Teflon) in this embodiment example can be absorbed.

When the valve plate 4 is pushed into in the position (FIG. 3) in which the valve opening 2 is covered, but the seal connection piece 7 is in the open, i.e., not sealed, position, the contact ring 14 contacts the associated contact surface of the valve body 1 by its outer edge 22. This contact surface 25 is formed by the surface of the groove 12 in the valve body, which surface faces the valve plate 4, and the wall of the hollow space 3 facing the valve plate 4 in its area in which it opens into the through-channel forming the valve opening 2 through the valve body 1. The contact ring 14 can be pressed in to various degrees in the circumferential direction as was described above, so that manufacturing tolerances are absorbed. The depth to which it is pressed in will depend upon the force acting on the valve plate in direction vertical to its plane 20, that is, upon the differential pressure between the two sides of the valve. The plane 20 of the valve plate 4 which lies approximately parallel to the contact surface 25 can change somewhat in its inclination relative to the contact surface 25 (e.g., in the range of ±1°) with differential pressures acting in different ways.

In the position of the valve plate 4 (FIG. 3) in which the valve opening 2 is covered, the contact ring 14 causes a relatively small conductance, e.g., in the range of 0.2 l/sec to 3 l/sec (for nitrogen) depending on the construction and material of the contact ring. The minimum conductance of the valve that can be regulated can be sharply reduced in this way compared to conventional regulating slide valves.

For example, a valve according to the invention can advantageously be used to regulate molecular gas flows which occur in the vacuum range of $10^{-6}$ bar or less and which also play a role in the transition range ($<10^{-3}$ bar) and are characterized by large average free path lengths of the gas molecules.

In a preferred construction of the invention, a gap remains between the outer edge 22 of the contact ring 14 and the contact surface 25 on at least one location of the contact ring, possibly also at a plurality of points spaced apart from one another in circumferential direction, in the end position of the valve plate 4 in which the valve opening is covered. For this purpose, for example, the contact ring can be provided with a corresponding recess forming a depression in the outer edge 22. Another possibility for forming a remaining gap is shown in FIGS. 21 and 22 which will be explained more fully in the following. A defined minimum conductance of the regulating area of the valve can be adjusted by means of a remaining gap of this kind. Preferably, one individual remaining gap is provided, namely, in the area of the contact ring 14 in which the valve opening 2 is covered last when the valve plate 4 is moved into its position (FIG. 3) in which the valve opening 2 is completely covered. When the contact ring 14 is rigidly connected to the valve plate 4 in this area of the remaining gap so that no movements can occur relative to the valve plate (especially in radial direction of the valve plate due to existing play between the contact ring 14 and the side walls of the groove 15), a hysteresis behavior can be prevented with small regulated residual flows. The drive of the valve plate should be as free from play as possible.

FIGS. 12 and 13 show an embodiment form of the bearing of the contact ring 14 in which the side walls of the groove 15 have undercuts on both sides, so that an area is formed with an enlarged width in the vicinity of the base of the groove. The helical springs 18 whose diameter is greater than the width of the narrower area above them are arranged in this enlarged area. When the retaining ring 23 is removed and the contact ring 14 is taken out, the helical springs 18 can remain in this enlarged space, wherein they contact the offsets of the side walls of the groove 15. This substantially simplifies maintenance of the valve plate, for example, when cleaning or when the contact ring 14 is exchanged.

In the embodiment form according to FIGS. 14 and 15, a circumferentially extending wave spring 26 is arranged between the contact ring and the base of the groove for the springing support of the contact ring 14 instead of a plurality of helical spring. This also simplifies manufacture and servicing of the valve plate.

Instead of a wave spring, a disk spring could also be provided, for example. This disk spring could also be provided with V-shaped cutouts along its edge for reducing its spring constant (star spring). Other constructions of the springing-elastic support of the contact ring 14 are also conceivable and possible. For example, an O-ring made of a correspondingly soft springing-elastic material could be arranged between the contact ring and the base of the groove 15. In order to reduce the spring constant, this O-ring could also be constructed so as to be hollow on the inside (with connections between the inner hollow space and the outside), or it would be possible to use a material which is semicircular in cross section and whose open side could face the contact ring 14 or the base of the groove 15.

A particularly preferred embodiment form is shown in FIGS. 16 to 18. In this case, the shoulder 21 faces the center of the valve plate 4 and the retaining ring 23 lies on the inner side of the contact ring 14 in a recess in the inner side wall of the groove 15. The retaining ring 23 is again split and the end areas 27, 28 which are bent inward to form a half-circle project into a recess 29 of the valve plate and contact the edge of this recess 29 on one side and contact a clamping element 30 on the other side. The end area 28 is pulled in the direction of end area 27 by a spring 31 acting on the clamping element 30, so that the retaining ring 23 is permanently held under tension and is accordingly pulled into the recess in the inner side surface of the groove 15 even in case of thermal expansion of the retaining ring 23. Helical springs 18 are preferably provided again as a spring device for the contact ring 14 and are arranged in a groove 15 which is provided with lateral undercuts. Again, other spring devices are conceivable and possible.

A retaining spring 23 is omitted in the embodiment form according to FIGS. 19 and 20. The outer side wall of the groove 15 has an undercut, so that a stop surface 32 for a corresponding shoulder of the contact ring 14 has a widening 33 on this side. A portion of the groove 15 is widened 34. The undercut of the outer side wall of the groove 15 is omitted in this portion due to the widening 34. This portion with the widening 34 serves for threading the contact ring 14 into the groove 15 beginning with one of its split ends.

FIGS. 21 and 22 show an embodiment example for forming a remaining gap in the end position of the valve plate 4 in which the valve opening is covered. The contact ring 14 has an inner retaining ring 23 (for example, as described in FIGS. 16 to 18). A threaded bore hole 35 is provided in the valve plate 4 at a point on the circumference of the contact ring 14, particularly at the point on the circumference where the valve opening 2 is the last to be covered by the valve plate 4 when the latter is displaced into the closing position. The diameter of the threaded bore hole 35 on the side facing the groove 15 intersects with this groove 15 somewhat, so that the threaded bore hole 35 is open toward the groove 15. The contact ring 14 projects somewhat into the diameter of the threaded bore hole 35 with its inwardly projecting widening 33. By screwing a stud screw 36 into the threaded bore hole 35, a thread is cut into the widening 33 and the contact ring 14 is fixed in this area in the direction of the base of the groove 15 and is clamped against the latter or against a spring element that is completely pressed in between the base of the groove and the contact ring 14 and is fixed in this position. Due to the flexibility of the contact ring 14 and of the springing bearing support of the same, the contact ring 14 is pressed outward in a curved shape on both sides of the stud screw 36, so that, seen from the side, there is a recess 37 of the contact ring 14 in the area of the stud screw 36 (FIG. 22).

Although the contact ring 14 can be also be made of metal, for example, aluminum or stainless steel, it is preferably made from a plastic, particularly a vacuum-capable thermoplastic or duroplastic plastic (that is, not an elastomeric plastic). Examples of possible plastics are PTFE, FEP, PFA, PEEK, PI, PPS, PBT, PES or modified PTFE such as PTFE-TFM® by Dyneon®.

The required force for pressing in the contact ring 14 along its entire circumference by 1 nm can preferably be in the range of 0.6 to 2 N. The force required for pressing in the entire contact ring until reaching a position where it lies flush with the side surface 17 of the valve plate is between 1.5 and 5 N, for example. The force required for pressing in the contact ring locally by 1 mm can preferably be in the range of 0.1 to 0.4 N (in this case, considered from a point remote of the point of a possible regulating gap in which the contact ring is steadily pressed in).

In order to generate as few particles as possible through the contact of the contact ring 14 at the contact surface 15, the contact ring 14 should have the smallest possible coefficient of friction in relation to the contact surface 25. Since the contact ring 14 can be oriented on the pump side and contact at the contact surface 25 does not occur until the throughflow opening of the valve is already relatively small, generated particles are pumped off for the most part and only a small portion reach a vacuum chamber connected to the other sides of the valve.

In order to further reduce the generation of particles and/or to reduce wear on the contact ring, a so-called L-movement of the valve plate 4 could also be provided. In so doing, this valve plate 4 is displaced in its plane 20 until reaching a position (FIG. 3) in which the valve opening 2 is completely covered, followed by a displacement in a direction vertical thereto, namely, in the direction of the contact surface 25. This last movement is carried out over a relatively short distance, for example, in the range of 2 mm. Drives for carrying out such L-movements are known. Also, a movement diagonal to the contact surface 25, also known as a J-movement, could be carried out over the last part of the closing movement. An embodiment example of a regulating slide valve according to the invention with a J-movement of the valve plate is shown in FIGS. 23 to 30.

The basic construction of the valve shown in FIGS. 23 to 30 corresponds to that of the embodiment examples already shown, only the drive for the displacement of the valve plate is modified. The valve plate 4 can be swiveled around the swiveling axis 6 formed by the axle pin 13 which is rigidly connected to the valve plate. The axle pin 13 has a rotating ring 38 which is rigidly connected to it and which projects outward. Two rollers 39 are rotatably supported at the rotating ring 38 at opposite positions, their axes being oriented radial to the swiveling axis 6. The axle pin 13 with the rotating ring 38 and the valve plate 4 are supported in the direction of the swiveling axis 6 so as to be displaceable by a short distance, e.g., 4 mm. The axle pin 13 and, therefore, the valve plate 4 are displaced into their end position, at right in the drawing, by a pressure spring 40 which is only shown schematically. The rollers 39 lie in troughs 41 of a control disk 42 which rests on a flange 43 projecting outward from the axle pin 13 and can rotate along with the latter initially when the axle pin 13 is rotated about the swiveling axis 6.

Shortly before reaching the end position of the valve plate 4 in which the valve opening 2 is completely covered (shortly before the position shown in FIG. 27), the control disk 42 strikes a stop 44, shown schematically in the drawing, which is fixed with respect to the valve body. For example, a pin forming the stop 44 stops against the end of a groove which is introduced into the control disk. Accordingly, with another rotation of the axle pin 13, the rollers 39 begin to roll out of the lowest point of the troughs 41, so that the rotating ring 38 and, therefore, the axle pin 13 and the valve plate 4 are displaced in axial direction against the force of the pressure spring 40 when rotating farther around the swiveling axis.

In the completely open position of the valve plate 4 (FIG. 23) and at the start of its closing movement (FIG. 25), the contact ring 14 can therefore be at a distance from the contact surface 25 (see FIG. 4) or can be pressed against the latter only a little. In the end position of the regulating area according to FIG. 27, on the other hand, the contact ring 14 is pressed against the contact surface 25. The generation of particles in the regulating area of the valve can be reduced by a J-movement of the valve plate 4 of this kind. In order to seal the valve completely, the seal connection piece 7 is displaced in the direction of the longitudinal axis 5 of the through-channel and is placed against the valve plate on the side surface located opposite from the seal connection piece (FIG. 30.)

The actuation of the valve can be carried out by means of a toothing arranged at the outer circumference of the rotating ring in which a drivable pinion engages.

When a regulating valve without a sealing function is to be provided, the seal connection piece 7 shown in the drawings could also be omitted.

In principle, it would also be conceivable and possible to provide a sealing ring on the side surface 17 of the valve plate 4 on which the contact ring 14 supported by a spring device is provided, which sealing ring surrounds the contact ring on the outside, for example. The sealing ring could contact the valve body at the end of an L-movement or J-movement. At least in case of a differential pressure which acts on the valve plate and presses the sealing ring against the valve body, a sealed state of the valve could also be produced in this way. This sealing ring could be constructed in the manner of a lip seal in particular.

Different modifications of the embodiment examples shown herein are conceivable and possible without departing from the field of the invention. The field of the invention is not limited to the embodiment examples shown herein, but rather should be defined with reference to the appended claims together with their full range of possible equivalents.

While the foregoing description and drawings represent the present invention, it will be obvious to those skilled in the art that various changes may be made therein without departing from the true spirit and scope of the present invention.

REFERENCE NUMBERS:

1 valve body
2 valve opening
3 hollow space
4 valve plate
5 longitudinal axis
6 swiveling axis
7 seal connection piece
8 sealing ring
9 wall
10 sealing ring
11 sealing surface
12 groove
13 axle pin
14 contact ring
15 groove
16 edge
17 side surface
18 helical spring
19 axis
20 plane
21 shoulder
22 outer edge
23 retaining ring
24 securing part
25 contact surface
26 wave spring
27 end area
28 end area
29 recess
30 clamping element
31 spring
32 stop surface
33 widening
34 widening
35 threaded bore hole
36 stud screw
37 recess
38 rotating ring
39 roller
40 pressure spring
41 trough
42 control disk
43 flange
44 stop

What is claimed is:

1. A regulating slide valve comprising:

a valve body having a valve opening; and a valve plate which has two side surfaces and which is displaceable along a displacement path between an initial position in which it releases the valve opening and an end position in which it completely covers the valve opening, said displacement path forming the regulating range of the valve;

said valve plate having a contact ring on one side surface, which contact ring projects over the side surface of the valve plate and being mounted at or in the valve plate by a spring device, can be pressed in against the spring force of the spring device in the direction of the valve plate and contacts a contact surface of the valve body at least over a portion of its circumference in the end position of the valve plate, the contact ring is mounted in a groove of the valve plate and the groove has an area of greater width adjoining its base, which area is limited toward the surface of the valve plate by a step in both side walls of the groove, the latter begin adjoined by an area with a smaller width, and wherein the spring device has a plurality of helical springs which are spaced from one another in circumferential direction of the contact ring and which lie in the area of the groove having the larger width and whose diameter is greater than the width of the area of the groove having the smaller width.

2. A regulating slide valve comprising:

a valve body having a valve opening; and a valve plate which has two side surfaces and which is displaceable along a displacement path between an initial position in which it releases the valve opening and an end position in which it completely covers the valve opening, said displacement path forming the regulating range of the valve, said valve plate having a contact ring on one side surface, which contact ring projects over the side surface of the valve plate and being mounted at or in the valve plate by a spring device, can be pressed in against the spring force of the spring device in the direction of the valve plate and contacts a contact surface of the valve body at least over a portion of its circumference in the end position of the valve plate, wherein the contact ring is split and the two ends of the contact ring overlap by a distance (d) viewed in circumferential direction.

3. A regulating slide valve comprising:

a valve body having a valve opening; and a valve plate which has two side surfaces and which is displaceable along a displacement path between an initial position in which it releases the valve opening and an end position in which it completely covers the valve opening, said displacement path forming the regulating range of the valve, said valve plate having a contact ring on one side surface, which contact ring projects over the side surface of the valve plate and being mounted at or in the valve plate by a spring device, can be pressed in against the spring force of the spring device in the direction of the valve plate and contacts a contact surface of the valve body at least over a portion of its circumference in the end position of the valve plate, wherein a gap remaining between the contact ring and the oppositely located contact surface is formed in the end position of the valve plate at at least one point on the circumference and a press-in part holding the contact ring in a pressed in position in this area is provided to form the remaining gap.

4. A regulating slide valve comprising:

a valve body having a valve opening; and a valve plate which has two side surfaces and which is displaceable along a displacement path between an initial position in which it releases the valve opening and an end position in which it completely covers the valve opening, said displacement path forming the regulating range of the valve, said valve plate having a contact ring on one side surface, which contact ring projects over the side surface of the valve plate and being mounted at or in the valve plate by a spring device, can be pressed in against the spring force of the spring device in the direction of the valve plate and contacts a contact surface of the valve body at least over a portion of its circumference in the end position of the valve plate, wherein the contact ring is held in a groove of the valve plate by a retaining ring, and wherein the retaining ring is inserted into a recess in a side wall of the groove.

5. A regulating slide valve comprising:

a valve body having a valve opening;

a valve plate which has first and second side surfaces and which is displaceable along a displacement path between an initial position in which it releases the valve opening and an end position in which it completely covers the valve opening;

a seal connection piece with a first sealing ring which contacts a sealing surface of the valve body and a second sealing ring for cooperating with a sealing surface at a first side surface of the valve plate facing the seal connection piece, wherein the seal connection piece is displaceable in the end position of the valve plate between a passive position in which it is lifted from the valve plate and an active position in which it contacts the first side surface of the valve plate and in which the second sealing ring contacts the sealing surface of the valve plate and in which the valve plate is sealed relative to the valve body with the intermediary of the seal connection piece; and a contact ring which is arranged at the second side of the valve plate remote of the seal connection piece and which projects over the second side surface of the valve plate and is mounted at or in the valve plate by means of a spring device, the contact ring can be pressed in against the spring force of the spring device in the direction of the valve plate and contacts a contact surface of the valve body at least over a portion of its circumference in the end position of the valve plate, wherein a regulating range of the valve is formed in the passive position of the seal connection piece by the displacement path of the valve plate between its initial position and its end position, and the conductance of the valve can be regulated by means of this regulating range from a maximum value in the initial position of the valve plate to a minimum value that is greater than 0 in the end position of the valve plate.

6. The regulating slide valve according to claim 5, wherein the spring device has a plurality of springs arranged at a distance from one another in the circumferential direction of the contact ring.

7. The regulating slide valve according to claim 6, wherein at least ten springs are provided at a distance from one another in the circumferential direction of the contact ring.

8. The regulating slide valve according to claim 6, wherein the springs are helical springs whose axis is vertical to the plane of the valve plate.

9. The regulating slide valve according to claim 5, wherein the spring device is formed by a wave spring whose waves alternately contact the valve plate and the contact ring.

10. The regulating slide valve according to claim 5, wherein the contact ring is mounted in a groove of the valve plate.

11. The regulating slide valve according to claim 5, wherein a gap remaining between the contact ring and the oppositely located contact surface of the valve body is formed in the end position of the valve plate at at least one point on the circumference of the contact ring.

12. The regulating slide valve according to claim 11, wherein a said remaining gap is present only at one individual point on the circumference of the contact ring, and the circumferential point of the remaining gap is located in the area of the contact ring in which the valve opening is covered last by the valve plate when the valve plate is moved into the end position.

13. The regulating slide valve according to claim 5, wherein the contact ring is made of plastic.

14. The regulating slide valve according to claim 13, wherein the plastic is a thermoplastic or duroplastic.

15. The regulating slide valve according to claim 14, wherein the contact ring is made of PTFE.

16. The regulating slide valve according to claim 5, wherein the minimum conductance of the regulating area with respect to nitrogen is less than 1 l/sec.

17. The regulating slide valve according to claim 10, wherein the contact ring is inserted into a groove in the valve plate having an undercut and this undercut forms a stop face for a widening of the contact ring.

18. The regulating slide valve according to claim 17, wherein the groove has a widening by means of which the split contact ring can be inserted into the groove starting with one of its split ends.

19. The regulating slide valve according to claim 5, wherein the valve plate approaches the contact surface of the valve body when displaced between its starting position and its end position.

20. The regulating slide valve according to claim 5, wherein the force for pressing in the contact ring over its entire circumference by 1 mm is between 0.7 and 3 N.

21. The regulating slide valve according to claim 5, wherein the force for locally pressing in the contact ring by 1 mm is between 0.1 and 0.4 N.

22. A regulating slide valve comprising:

a valve body having a valve opening;

a valve plate which has two side surfaces and which is displaceable along a displacement path between an initial position in which it releases the valve opening and an end position in which it completely covers the valve opening, wherein this displacement path forms the regulating range of the valve by means of which the conductance of the valve can be regulated from a maximum value in the initial position of the valve plate to a minimum value that is greater than 0 in the end position of the valve plate; and a contact ring which is arranged on one of the side surfaces of the valve plate and which projects over this side surface of the valve plate and is mounted at or in the valve plate by means of a spring device and can be pressed in against the spring force of the spring device in the direction of the valve plate and contacts a contact surface of the valve body at least over a portion of its circumference in the end position of the valve plate, wherein a gap remaining between the contact ring and the oppositely located contact surface of the valve body is formed in the end position of the valve plate at at least one point on the circumference of the contact ring.

23. The regulating slide valve according to claim 22, wherein a said remaining gap is present only at one individual point on the circumference of the contact ring, and the circumferential point of the remaining gap is located in the area of the contact ring in which the valve opening is covered last by the valve plate when the valve plate is moved into the end position.

24. The regulating slide valve according to claim 22, wherein the contact ring is made of plastic.

* * * * *